(12) United States Patent  (10) Patent No.: US 7,137,725 B2
Tseng et al.  (45) Date of Patent: Nov. 21, 2006

(54) DOUBLE-SIDED BACKLIGHT MODULE

(75) Inventors: Wen-Pao Tseng, Yangmei Taoyuan (TW); Hsin-Chien Chiang, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 36 days.

(21) Appl. No.: 11/099,638

(22) Filed: Apr. 6, 2005

(65) Prior Publication Data

US 2006/0227529 A1 Oct. 12, 2006

(51) Int. Cl.
*F21V 33/00* (2006.01)
(52) U.S. Cl. .................. 362/561; 362/559; 362/217
(58) Field of Classification Search .............. 362/31, 362/600, 616, 615, 632, 633, 634, 561, 559
See application file for complete search history.

(56) References Cited

U.S. PATENT DOCUMENTS

2004/0095745 A1* 5/2004 Wang .................... 362/84

\* cited by examiner

*Primary Examiner*—Laura K. Tso
(74) *Attorney, Agent, or Firm*—Troxell Law Offices, PLLC

(57) ABSTRACT

The present invention describes a backlight module that includes a lamp, a diffuser, an optical film and a liquid crystal display panel installed in sequence between a reflective mask and a diffuser, and the reflective mask has a light transmission window at the bottom, and the light transmission window includes a dimmer, an optical film and a sub liquid crystal display panel installed in sequence outside the light transmission window, so that a light is evenly emitted from the upper and lower liquid crystal display panels and sub liquid crystal display panels. The invention not only simultaneously displays screens, but also improves the light application rate.

10 Claims, 6 Drawing Sheets

DOUBLE-SIDED BACKLIGHT MODULE

BACKGROUND OF THE INVENTION

1. Field of the Invention

The present invention relates to an improved backlight module, more particularly to a double-sided backlight module that provides a single light source for simultaneously displaying screens on both upper and lower liquid crystal display panels.

2. Description of the Related Art

Referring to FIG. 1, a cross-sectional view of a backlight module of a general liquid crystal display panel according to a prior art is illustrated. An assembly of a whole backlight module comprises a reflective mask 1, a light source, a diffuser 2, an optical film 3, and a liquid crystal display panel 4 installed outwardly in sequence; wherein the light source could be a linear, a U-shaped or other continuously bent lamp 5 installed between the reflective mask 1 and the diffuser 2 with an appropriate distance apart. The display effect of the liquid crystal module depends on the light emitted by each lamp 5, and the diffuser 2 and the optical film 3 provide a function of diffusing the passing light to improve the bright and dark band areas occurred on the liquid crystal display panel at the position facing each lamp, where no light is produced.

However, the light of the lamp 5 is diffused in all directions. Since the liquid crystal display panel 4 is located only at one side of the backlight module, therefore the light diffused towards the backside of the lamp can be reflected by the reflective mask 1, and the light can be diffused from the liquid crystal module to achieve the display effect. Such arrangement loses part of the light when reflecting the light of the light source, and thus lowering the light application rate and only providing a single-sided display function, which has not fully used the light.

SUMMARY OF THE INVENTION

A primary object of the present invention is to provide a double-sided backlight module that uses a light source passing through an upper optical film and a lower optical film, and the light is diffused from both upper and lower sides of a liquid crystal display panel, not only simultaneously displaying screens, but also improving the light application rate.

The reflective mask has a light transmission window at the bottom, and the transmission window has a dimmer, an optical film and a sub liquid crystal panel installed in sequence outside, and each lamp installs a support structure on both sides of the reflective mask to fix each lamp. The support structure includes an upper clamp and a lower clamp, and the position where the upper and lower clamps are connected with each lamp constitutes the shape for covering the lamps. A fixing structure is used to fix the upper and lower clamps, and further each lamp is secured and fixed. The support structure has at least one support member facing upward and downward for securing the support structure between the upper, lower, left, and right optical films.

DETAILED DESCRIPTION OF THE PREFERRED EMBODIMENTS

Figure 1:
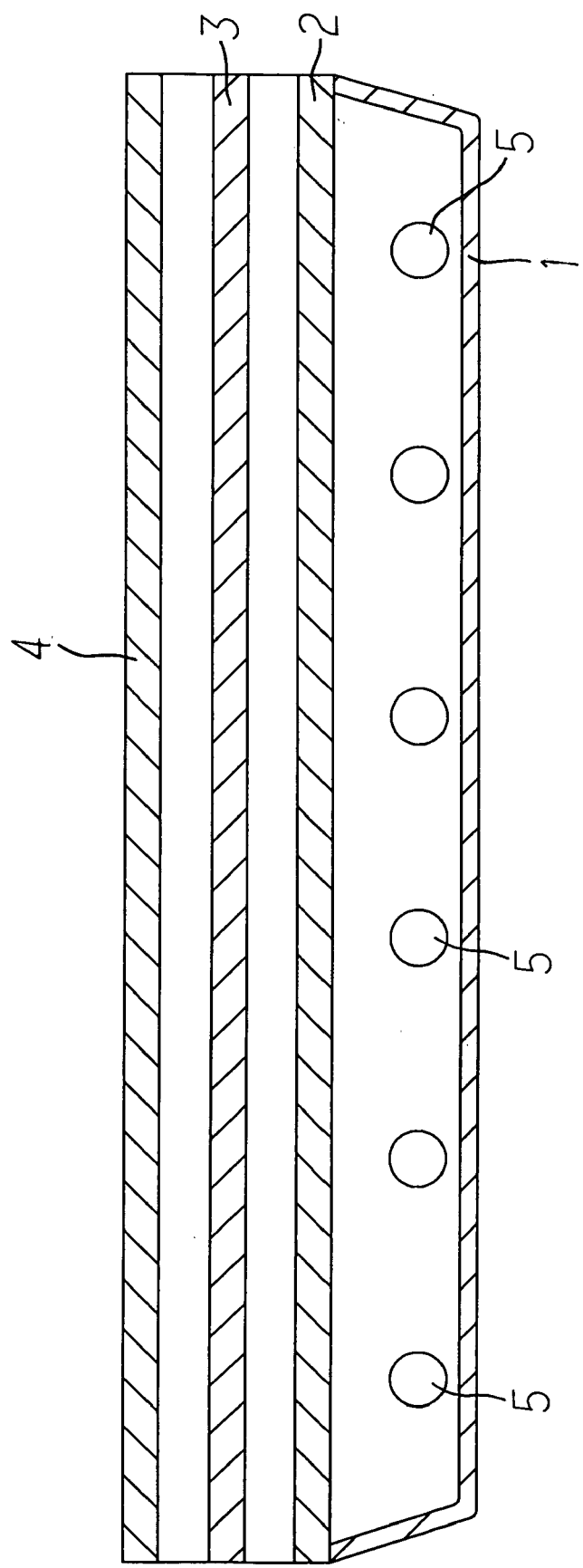
FIG. 1 is a schematic view of a structure of a backlight module according to a prior art.
Figure 2:
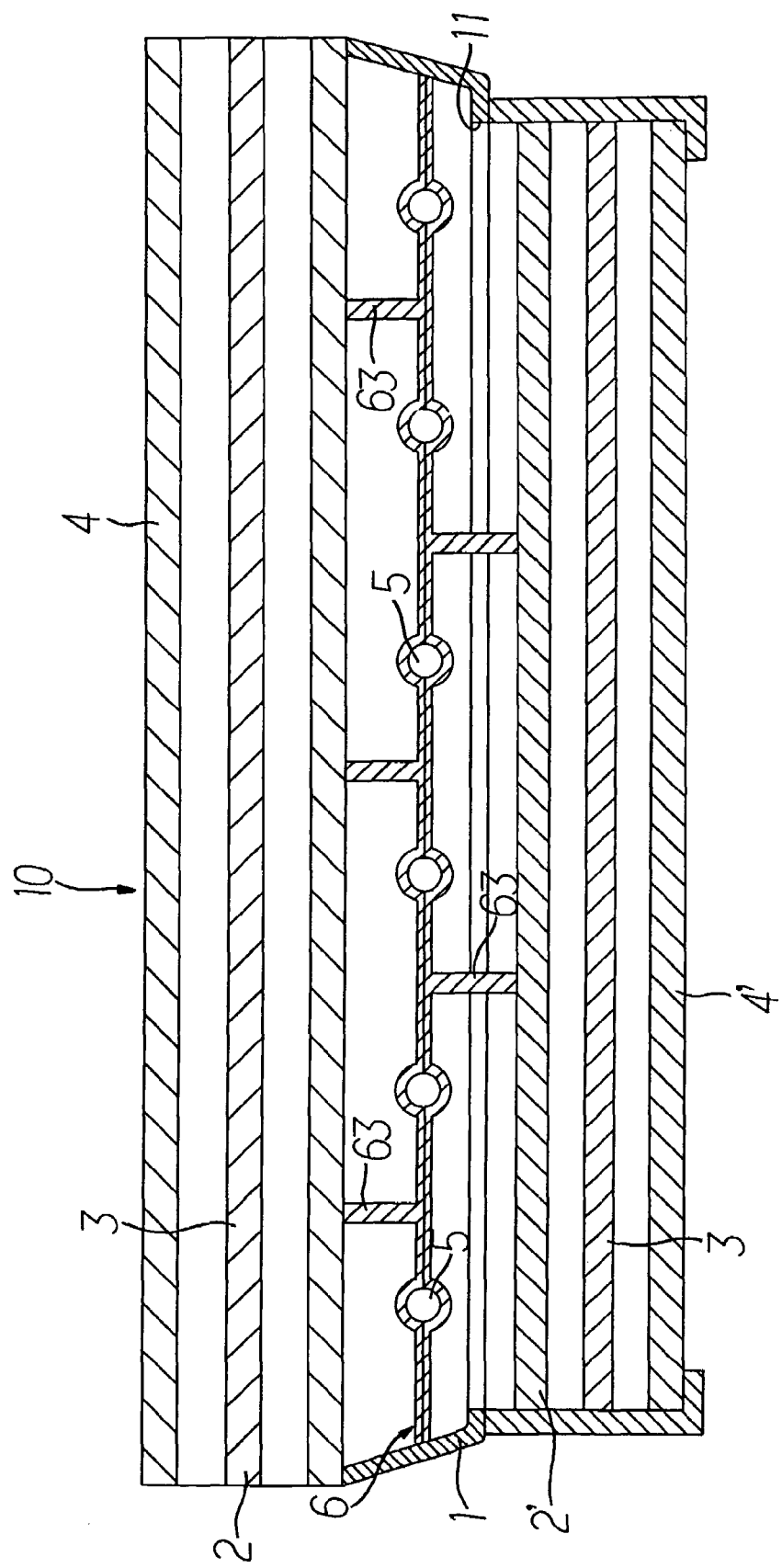
FIG. 2 is a schematic view of a double-sided backlight module according to a first preferred embodiment of the present invention.

Referring to FIG. 2, the applications and the basic structure of a double-sided backlight module according to the present invention is illustrated. A reflective mask 1 of the double-sided backlight module 10 installs a light source, a diffuser 2, an optical film 3 (which includes a prism, a reflective lens, and a polarizer in this preferred embodiment), and a liquid crystal display panel 4 installed in sequence; wherein the light source could be a linear, a U-shaped or other continuously bent lamp 5 installed between the reflective mask 1 and the diffuser 2 with an appropriate distance apart.

Figure 3:
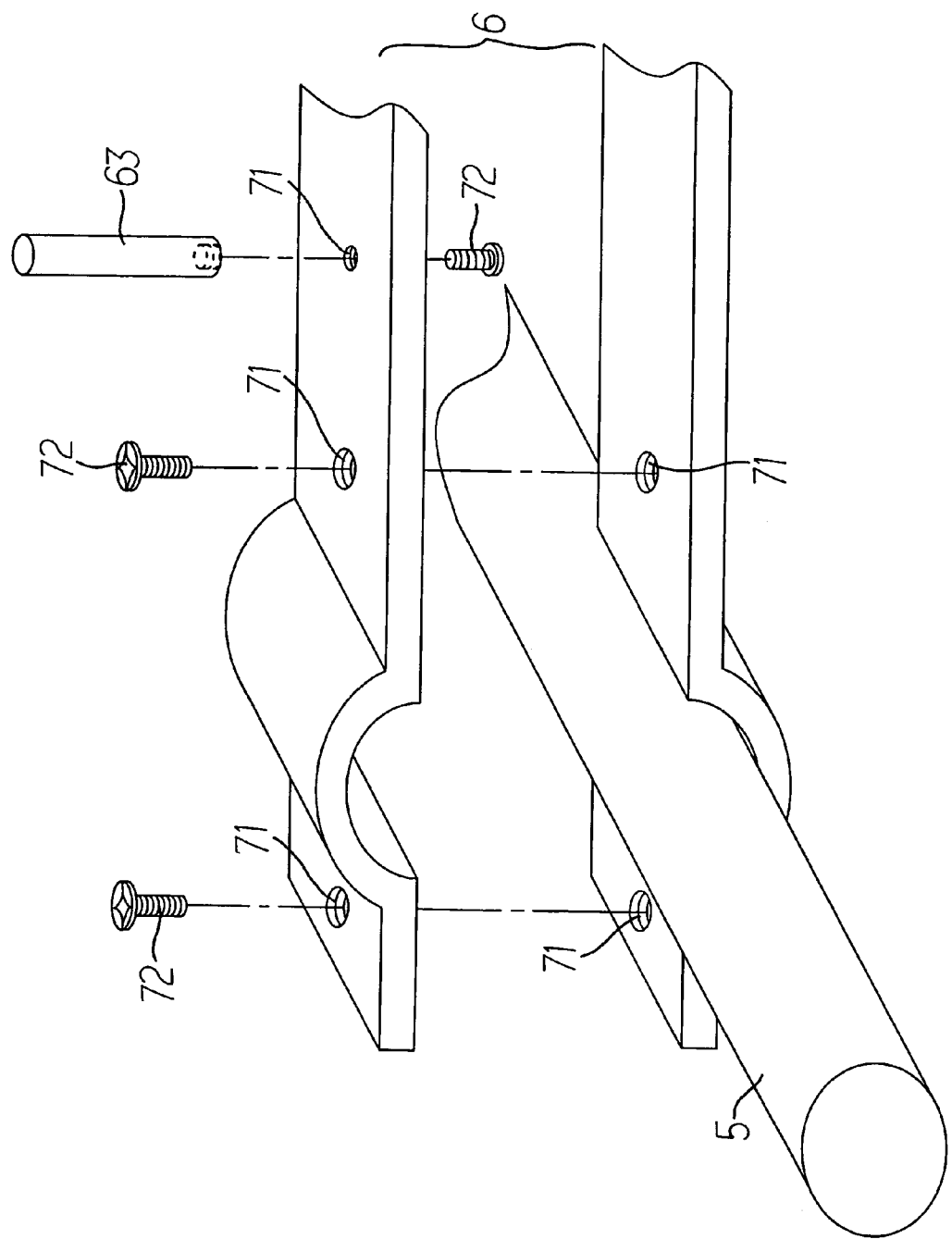
FIG. 3 is an exploded view of a support structure and a light source assembly of the present invention.

The main technical characteristics of the present invention resides on that the reflective mask 1 has a light transmission window 11 at the bottom, and the light transmission window 11 has a dimmer 2 (which is a transparent plate or a plate having a diffusive effect), an optical film 3, and a sub liquid crystal display panel 4 installed in sequence. Each lamp 5 is fixed by a support structure 6 installed on both sides of the reflective mask 4. Referring to FIG. 3, the support structure 6 comprises an upper clamp 61 and a lower clamp 62 having a dimming function, and the material of the upper and lower clamps 61, 62 could be made of a reflective, semi-reflective, semi-pervious or pervious material having a dimming function. The position where the upper and lower clamps 61, 62 are in contact with each lamp 5 forms a shape for covering the lamp 5. With a fixing structure, the upper and lower clamps 61, 62 are secured, and thus each lamp is fixed. The fixing structure comprises a screw hole 71 and a screw 62 to be secured into the screw hole 71 on the upper and lower clamps 61, 62 as shown in FIG. 3. The fixing structure may comprise a fixing pillar 73 and an insert hole 74 mutually engaged between the upper and lower clamps 61, 62, such that the upper and lower clamps 61, 62 can be fixed and thus each lamp 5 is secured. With the light of a single light source passing through the diffuser 2 and optical film 3 at the top and the dimmer 2' and optical film 3 at the bottom, the light is emitted evenly from the upper and lower liquid crystal display panel 4 and sub liquid crystal display 4', not only simultaneously displaying the screens, but also improving the light application rate.

Figure 5:
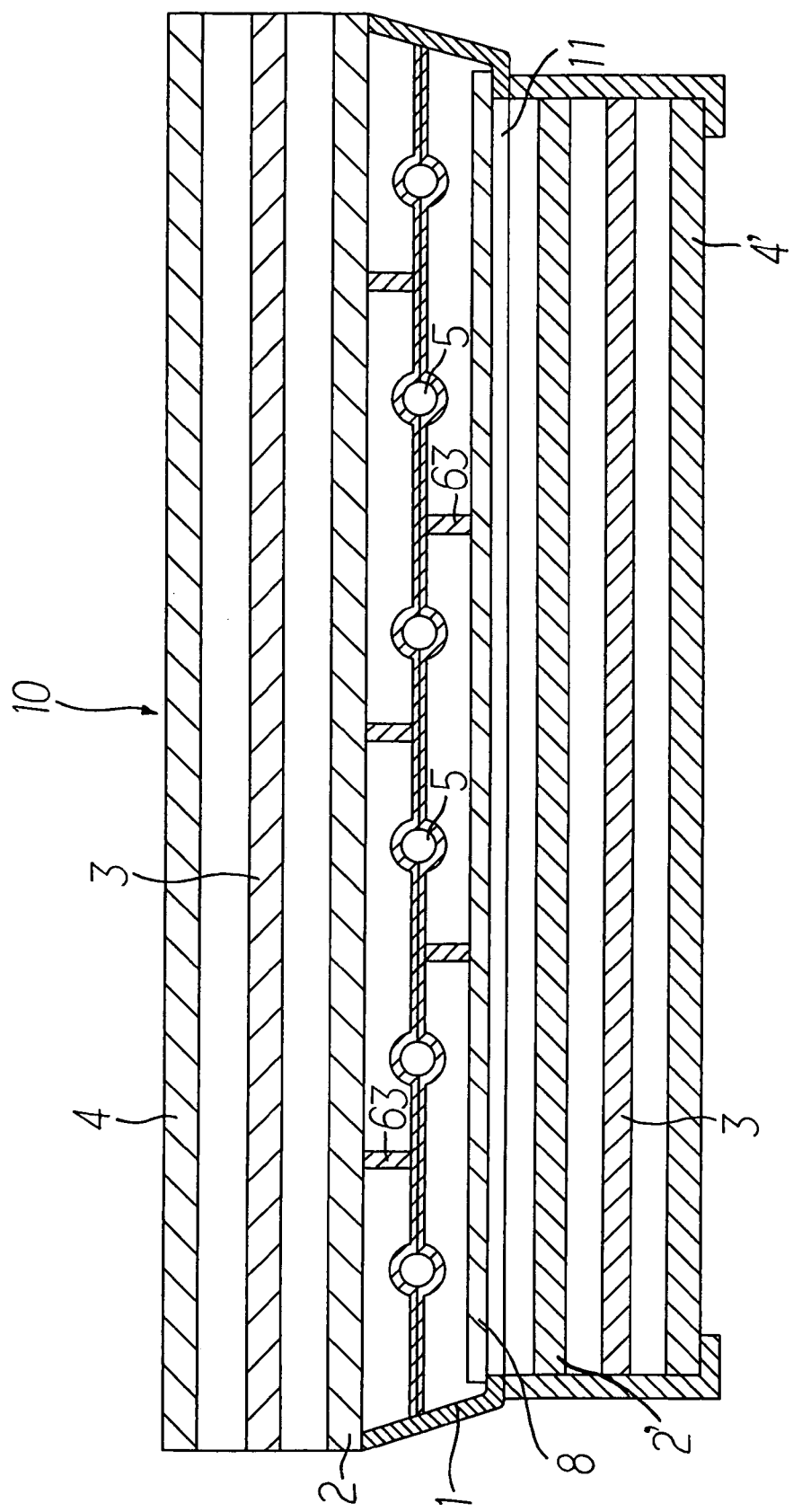
FIG. 5 is a schematic view of a double-sided backlight module according to a second preferred embodiment of the present invention.

Further, the dimmer 2' and the lamp 5 further comprise a film 8 having a light reflection function and a light transmission function as shown in FIG. 5, such that the light passing through the film is partially reflected and partially refracted to increase the light application rate.

Figure 6:
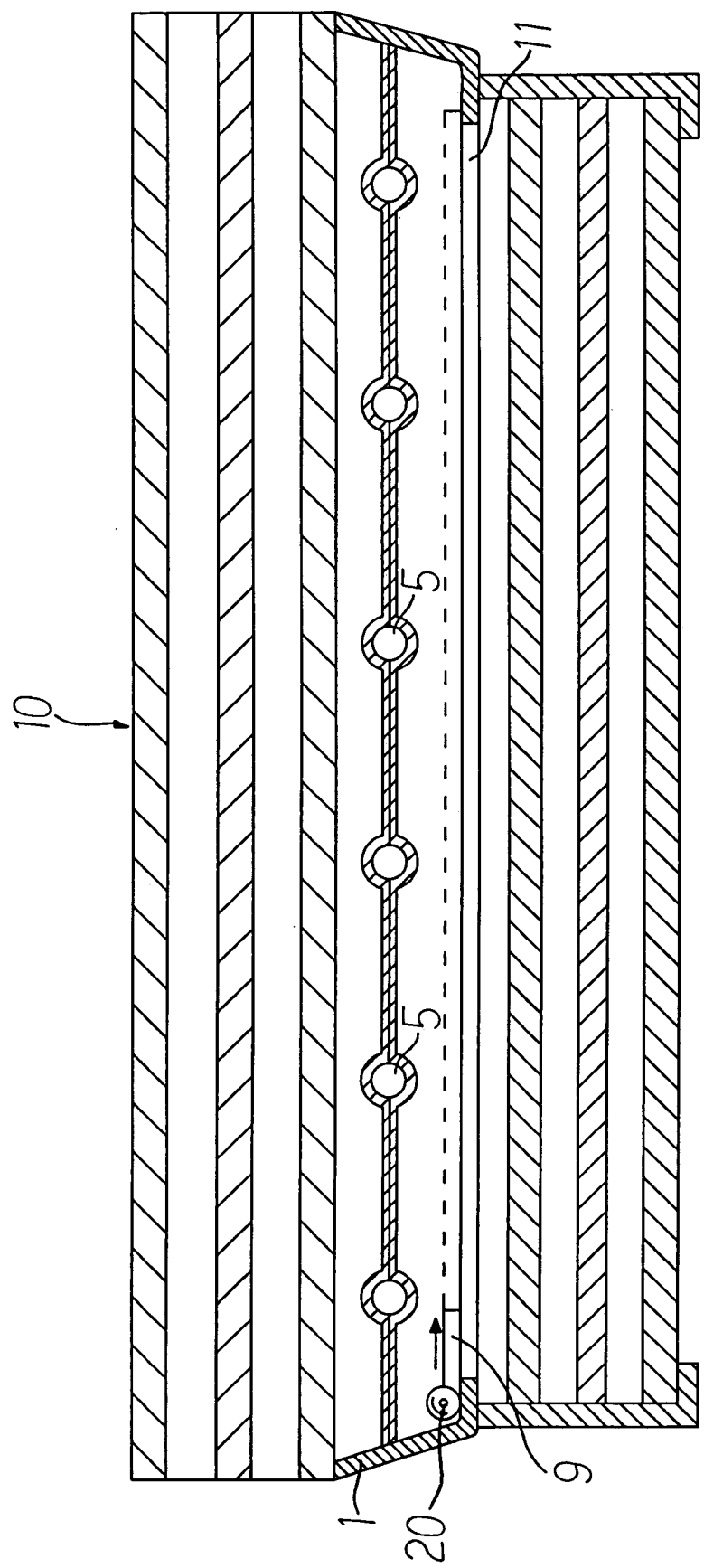
FIG. 6 is a double-sided backlight module according to a third preferred embodiment of the present invention.

An axle 20 is installed on both left and right sides of the reflective mask 1 and proximate to the light transmission window 11 as shown in FIG. 6, such that the axle 20 can drive a reflective plate 9 to cover the light transmission window 11, and the backlight module has a single display function by means of fully reflecting the light of the lamp 5 by the reflective plate 9, or the axle 20 withdraws the reflective plate 9 such that the light transmission window 11 is opened, and thus the backlight module has the double-sided display function.

Figure 4:
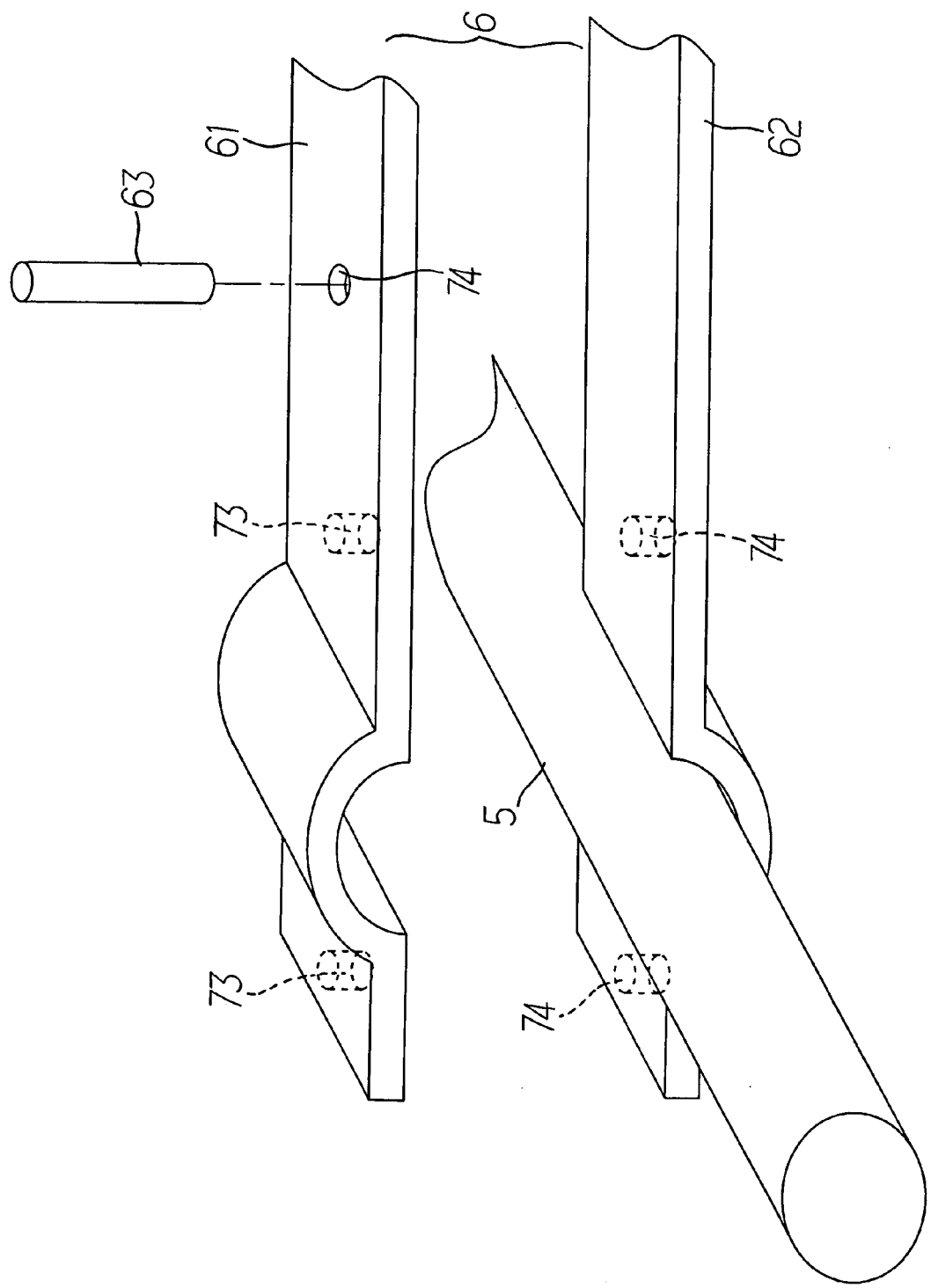
FIG. 4 is a schematic view of a fixing structure according to another preferred embodiment of the present invention.

Further, the support structure 6 includes a support member 63 with a dimming function installed at the top, bottom, left and right sides of the support structure 6, and the support structure 6 could be made of a reflective material, a semi-reflective material, a pervious material, or a semi-pervious material as shown in FIG. 2. Each support member 63 is integrally coupled with the top, bottom, left and right clamps 61, 62, and the outwardly protruded length of the support member 63 of the support structure 6 is corresponsive to the distance between the support structure 6 with the diffuser 2 and the dimmer 2', and each support member 63 is perpendicular to the diffuser 2 and the dimmer 2'. The outwardly protruded length of the left and right support members 63 of the support structure 6 is exactly latched into the reflective mask 1, so that after the diffuser 2 and the dimmer 2' are installed, the support member 63 presses onto the support structure 6 and into the reflective mask 1 for supporting the optical film 3 and liquid crystal display panel 4 at the top and the dimmer 2', optical film 3' and sub liquid crystal display panel 4' at the bottom, so that they will not be deformed or subsided. Furthermore, each lamp can be secured into the reflective mask. Of course, each support member 63 can use a screw 72 to be secured onto a screw hole 71 preinstalled on the support structure 6 as shown in FIG. 3 or inserted into an insert hole 74 preinstalled on the support structure 6 as shown in FIG. 4.

In summation of the description above, the present provides another preferred feasible double-sided backlight module structure, which fully complies with the patent application requirements. The description and its accompanied drawings are used for describing preferred embodiments of the present invention, and it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A double-sided backlight module, having a reflective mask with a light source, a diffuser, an optical film and a liquid crystal display panel installed in sequence; wherein said light source is a linear, U-shaped, or other continuously bent shaped lamp disposed between said reflective mask and said diffuser with an appropriate distance apart; characterized in that said reflective mask has a light transmission window at the bottom, and said light transmission window installs a dimmer, an optical film and a sub liquid crystal display panel, and a support structure having a light adjusting function and being disposed between the left and right internal sides of said reflective mask secures said each lamp, and said support structure has at least one support member facing the top, bottom, left and right sides for adjusting light, such that a light of said each lamp emits said light from said diffuser and said optical film at the top and said dimmer and said optical film at the bottom through the upper and lower liquid crystal display panel and said sub liquid crystal display panel, so as to achieve a double-sided light emitting function.

2. The double-sided backlight module of claim 1, wherein said optical film comprises a prism, a reflective plate, a polarizer.

3. The double-sided backlight module of claim 1, wherein said support structure comprises an upper clamp and a lower camp, and the position where a top, a bottom, a left and a right clamps are in contact with said each lamp define an external shape of covering said lamp, and said top, bottom, left and right clamps are fixed by said fixing structure.

4. The double-sided backlight module of claim 3, wherein said fixing structure comprises said top, bottom, left and right clamps being coupled by aligning a screw hole and securing a screw into said screw hole or by a mutually inserted fixing pillar and an insert hole.

5. The double-sided backlight module of claim 1, wherein said dimmer and said lamp further installs a film having a light reflection function and a light transmission function.

6. The double-sided backlight module of claim 1, wherein said reflective mask has an axle disposed on both internal sides proximate to said light transmission window for driving a reflective plate to cover or open said light transmission window.

7. The double-sided backlight module of claim 1, wherein said each support member is integrally coupled with said support structure.

8. The double-sided backlight module of claim 1, wherein said each support member uses a screw to be secured into a screw hole disposed on said support structure or inserted into an insert hole disposed on said support structure.

9. The double-sided backlight module of claim 1, wherein said support structure is made of a reflective material, a semi-reflective material, a semi-pervious material or a pervious material.

10. The double-sided backlight module of claim 1, wherein said each support member is made of a reflective material, a semi-reflective material, a semi-pervious material or a pervious material.

* * * * *